United States Patent
Yang et al.

(10) Patent No.: US 11,626,012 B2
(45) Date of Patent: Apr. 11, 2023

(54) HIERARCHICAL INTEGRATED TRAFFIC MANAGEMENT SYSTEM FOR MANAGING VEHICLES

(71) Applicant: Toyota Motor Engineering & Manufacturing North America, Inc., Plano, TX (US)

(72) Inventors: Hao Yang, Aliso Viejo, CA (US); Kentaro Oguchi, Sunnyvale, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 713 days.

(21) Appl. No.: 16/599,667

(22) Filed: Oct. 11, 2019

(65) Prior Publication Data
US 2021/0110708 A1  Apr. 15, 2021

(51) Int. Cl.
*G08G 1/01* (2006.01)
*G08G 1/00* (2006.01)
(Continued)

(52) U.S. Cl.
CPC ......... *G08G 1/0112* (2013.01); *G05D 1/0088* (2013.01); *G08G 1/096838* (2013.01);
(Continued)

(58) Field of Classification Search
CPC ........... G08G 1/0112; G08G 1/096838; G08G 1/096844; G08G 1/167; G08G 1/207;
(Continued)

(56) References Cited

U.S. PATENT DOCUMENTS 6,611,750 B2 * 8/2003 MacPhail ............. G08G 1/0104
340/993
8,618,951 B2 12/2013 Popovic
(Continued)

FOREIGN PATENT DOCUMENTS

CN   108039053 A   5/2018
CN   108447291 A   8/2018
(Continued)

OTHER PUBLICATIONS

L.D. Baskar, et al., "Hierarchical Traffic Control and Management with Intelligent Vehicles," IEEE Intelligent Vehicle Symposium, Conference Paper pp. 834-839, Jul. 2007.
(Continued)

*Primary Examiner* — Thomas Ingram
(74) *Attorney, Agent, or Firm* — Dinsmore & Shohl LLP

(57) ABSTRACT

A system for managing vehicles includes a plurality of first level managers, and a plurality of second level managers each being in a higher hierarchical level than the plurality of first level managers and managing a section. Each of the plurality of first level managers collects data using one or more sensors of a vehicle, abstracts the data to obtain first information, and transmits a first instruction to the vehicle based on the first information. One of the plurality of second level managers receives the first information from one or more of the plurality of first level managers in the section managed by the one of the plurality of second level managers, obtains second information based on the first information, and transmits a second instruction to the vehicle based on the second information. The first instruction is different from the second instruction.

18 Claims, 10 Drawing Sheets

(51) Int. Cl.
*G05D 1/00* (2006.01)
*G08G 1/0968* (2006.01)
*G08G 1/16* (2006.01)

(52) U.S. Cl.
CPC ....... *G08G 1/096844* (2013.01); *G08G 1/167* (2013.01); *G08G 1/207* (2013.01); *G05D 2201/0213* (2013.01)

(58) Field of Classification Search
CPC .. G08G 1/0129; G08G 1/0141; G08G 1/0145; G08G 1/04; G08G 1/052; G05D 1/0088; G05D 2201/0213
See application file for complete search history.

(56) References Cited

U.S. PATENT DOCUMENTS

| | | | | |
|---|---|---|---|---|
| 2003/0058081 A1* | 3/2003 | MacPhail | ................. | G08G 1/14 340/5.1 |
| 2003/0060965 A1* | 3/2003 | MacPhail | ............. | G08G 1/0104 340/907 |
| 2003/0060966 A1* | 3/2003 | MacPhail | ............. | G08G 1/0104 340/907 |
| 2003/0060967 A1* | 3/2003 | MacPhail | ............. | G08G 1/0104 340/907 |
| 2003/0060968 A1* | 3/2003 | MacPhail | ............. | G08G 1/0104 701/117 |
| 2003/0144790 A1* | 7/2003 | MacPhail | ............. | G08G 1/0104 342/456 |
| 2007/0271029 A1* | 11/2007 | Tzamaloukas | ......... | G01C 21/28 701/532 |
| 2016/0379486 A1* | 12/2016 | Taylor | ..................... | G08G 1/08 340/905 |
| 2019/0222652 A1* | 7/2019 | Graefe | .................. | H04W 84/18 |
| 2019/0244518 A1* | 8/2019 | Cheng | .................. | G08G 1/0145 |
| 2022/0136474 A1* | 5/2022 | Ostrowski | ............ | A61B 5/7275 123/179.4 |

FOREIGN PATENT DOCUMENTS

| | | |
|---|---|---|
| CN | 109118758 A | 1/2019 |
| CN | 109285373 A | 1/2019 |
| WO | 2018132378 A2 | 7/2018 |

OTHER PUBLICATIONS

Fei-Yue Wang, "Agent-Based Control for Networked Traffic Management Systems," IEEE Intelligent Systems, vol. 20(5), pp. 92-96, 2005.

Simom Halle, et al., "Architectures for Collaborative Driving Vehicles: From a Review to a Proposal," University of Laval, Article, 2003.

Tsugawa Sadayuki, et al., "An Architecture for Cooperative Driving of Automated Vehicles," IEEE Intelligent Transportation Systems, pp. 422-427, 2000.

Pravin Varaiya, "Smart Cars on Smart Roads: Problems of Control," IEEE Transaction on Automatic Control, vol. 28(2), pp. 195-207, 1993.

K L Head, et al., "Hierarchical Framework for Real-Time Traffic Control," Transportation Research Record, pp. 82-88, 1992.

* cited by examiner

HIERARCHICAL INTEGRATED TRAFFIC MANAGEMENT SYSTEM FOR MANAGING VEHICLES

TECHNICAL FIELD

The present specification relates to managing a plurality of vehicles in response to road events, and more particularly, to managing vehicles in response to road events based on instructions from various hierarchical level managers (e.g., in-car level managers, section level managers, locality level managers, city level managers, and the like) of the traffic management system.

BACKGROUND

Road events, such as vehicle collisions, constructions, road closures, and the like, may result in serious traffic congestions. In addition, such road events may cause inconvenience to human drivers, and reduce the quality of transportation services. Connected vehicles and roadside infrastructure may allow managing the behaviors of individual vehicles. However, connected vehicles generate large volumes of data (e.g., kinematics data related to speed, direction, and accelerations/decelerations, and sensor data, such as data related to a sensed steering angle and a sensed input acceleration pedal force) that need to be processed to extract useful information and produce results or predictions in real-time by utilizing the capabilities of edge computing. Due to the size of road networks and the number of vehicles on the road, it is very challenging to manage all vehicles efficiently with lower latencies.

Accordingly, a need exists for providing a method and system that resolve the impact of road events on the performance of vehicles in large-scale road networks with low latencies.

SUMMARY

The present disclosure provides an integrated traffic management system that addresses the impact of road events on the performance of connected and automated vehicles (CAVs) in large-scale road networks. A vehicle-oriented hierarchical framework is designed to implement the present system. The integrated traffic management system includes multiple hierarchical layers of managers. The integrated traffic management system contains two aspects. The first aspect is traffic information collection and abstraction. The second aspect is vehicle guidance. The information collection starts from the lowest layer (e.g., an in-car level). The collected information is abstracted at higher levels of road networks to achieve real-time update of traffic conditions and road event status with low latencies. The vehicle guidance is assigned to each level of the hierarchical system with respect to the available information to help vehicles and to mitigate road congestions and events. In contrast with conventional frameworks, the present system considers both information collection from vehicles and vehicle instructions to the vehicles. In addition, the present system can work for various penetration rates as it does not require vehicle platooning control.

In one embodiment, a system for managing vehicles is provided. The system includes a plurality of first level managers, and a plurality of second level managers each being in a higher hierarchical level than the plurality of first level managers and managing a section. Each of the plurality of first level managers collects data using one or more sensors of a vehicle, abstracts the data to obtain first information, and transmits a first instruction to the vehicle based on the first information. One of the plurality of second level managers receives the first information from one or more of the plurality of first level managers in the section managed by the one of the plurality of second level managers, obtains second information based on the first information, and transmits a second instruction to the vehicle based on the second information. The first instruction is different from the second instruction.

In another embodiment, a method for managing vehicles is provided. The method includes collecting, by a first level manager, data using one or more sensors of a vehicle, abstracting, by a first level manager, the data to obtain first information, transmitting, by a first level manager, the first information to a second level manager, the second level manager being in a higher hierarchical level than the first level manager, obtaining, by the second level manager, second information based on the first information, transmitting, by the first level manager, a first instruction to the vehicle based on the first information, and transmitting, by the second level manager, a second instruction to the vehicle based on the second information.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Figure 1A:
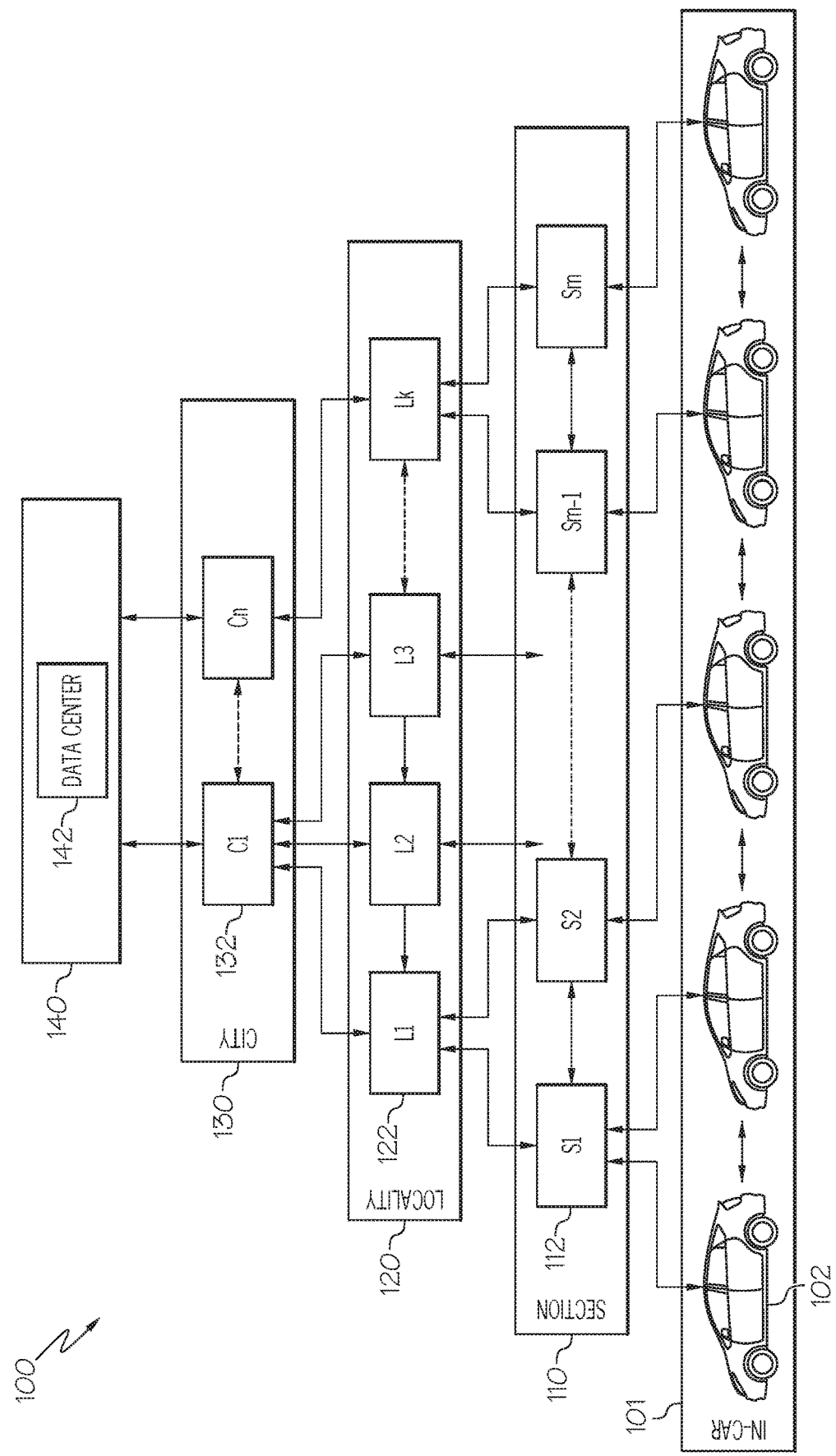
FIG. 1A schematically depicts a hierarchical integrated traffic management system for controlling vehicles, according to one or more embodiments shown and described herein.
Figure 1B:
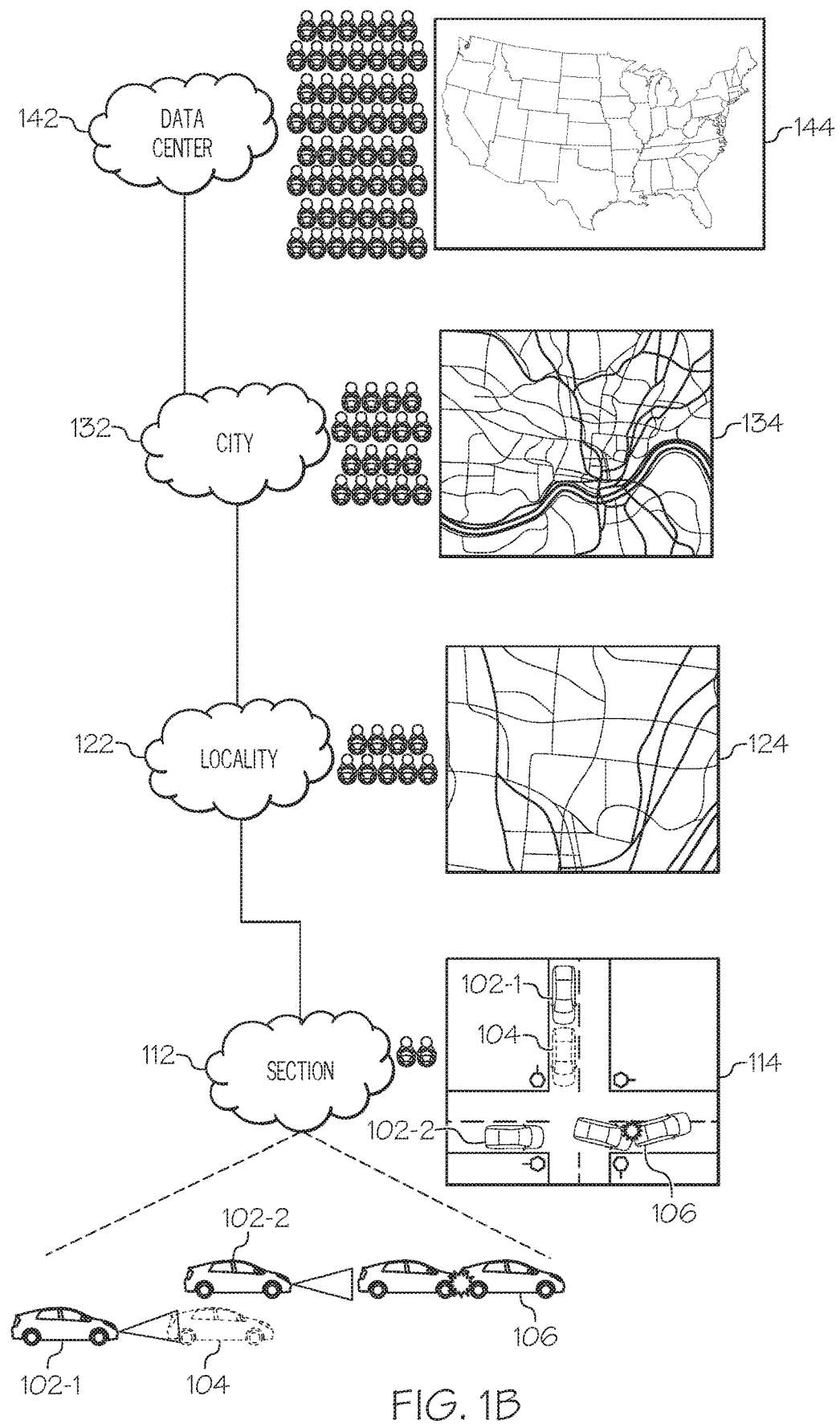
FIG. 1B schematically depicts a hierarchical integrated traffic management system with multi-level managers and corresponding management areas, according to one or more embodiments shown and described herein.

The embodiments disclosed herein include systems and methods for managing vehicles in response to road events based on instructions from various hierarchical level managers (e.g., in-car level managers, section level managers, locality level managers, city level managers, and the like) of the traffic management system. Referring to FIGS. 1A and 1B, the hierarchical integrated traffic management system 100 for controlling vehicles includes a plurality of first level managers, such as in-car level managers 102, a plurality of second level managers, such as section level managers 112. Each of the section level managers 112 is in a higher hierarchical level than the plurality of in-car level managers and manages corresponding section, for example, a section 114 in FIG. 1B. The hierarchical integrated traffic management system 100 also includes a plurality of third level managers, such as locality level managers 122, a plurality of fourth level managers, such as, city level managers 132, and a fifth level manager, such as a data center 142. Each of the plurality of in-car level managers 102 collects data using one or more sensors of a vehicle, abstracts the data to obtain first information, and transmits a first instruction to the vehicle based on the first information. For example, by referring to FIG. 1B, the in-car level manager 102 of the connected vehicle 102-1 collects data about a non-connected vehicle 104 using one or more sensors of the connected vehicle 102-1. The in-car level manager 102 of the connected vehicle 102-2 collects data about an incident 106 using one or more sensors of the connected vehicle 102-1. One of the plurality of section level managers receives the first information from one or more of the plurality of first level managers in the section managed by the one of the plurality of second level managers, obtains second information based on the first information, and transmits a second instruction to the vehicle based on the second information. For example, by referring to FIG. 1B, the section level manager 112 receives information from the in-car level manager 102 of the connected vehicle 102-1 and the in-car level manager 102 of the connected vehicle 102-2 and obtains vehicle dynamics and features and road event information based on the received information. Then, the section level manager 112 may transmit instructions to the connected vehicles 102-1 and 102-2 based on the vehicle dynamics and features and road event information.

The hierarchical integrated traffic management system contains two aspects. The first aspect is traffic information collection and abstraction. The second aspect is vehicle guidance. The information collection starts from the lowest layer (e.g., an in-car level). The collected information is abstracted at higher levels of road networks to achieve real-time update of traffic conditions and road event status with low latencies. The vehicle guidance is assigned to each level of the hierarchical system with respect to the available information to help vehicles and mitigate road congestions and events. In contrast with conventional frameworks, the present system considers both information collection and vehicle instructions for vehicles, and it also can work for various penetration rates as it does not require vehicle platooning control.

Compared with the existing traffic management frameworks, the present hierarchical integrated traffic management system has several advantages. First, the present disclosure applies a hierarchical framework to monitor traffic conditions and controls connected vehicles with lower latencies at various levels of road networks. Second, the system is vehicle-oriented, which can work for various market penetration rates of connected vehicles, and may increase the performance of connected vehicles on large-scale road networks. The present system may satisfactorily address road events, especially their impact on vehicles' behavior and entire road congestions. The present system may be extended to all kinds of abnormal situations in transportation systems.

FIG. 1A schematically depicts a hierarchical integrated traffic management system 100 for controlling vehicles, according to one or more embodiments shown and described herein. In embodiments, the hierarchical integrated traffic management system 100 consists of multiple levels of managers. For example, as shown in FIG. 1, the hierarchical integrated traffic management system 100 consists of five levels: a first level 101, a second level 110, a third level 120, a fourth level 130, and a fifth level 140. In some embodiments, the hierarchical integrated traffic management system 100 may consist of more than or less than five levels.

The first level 101 may include a plurality of first level managers, for example, in-car level managers 102. The in-car level managers 102 may be a plurality of vehicles, or controllers in the plurality of vehicles. The plurality of vehicles may be connected vehicles or connected and autonomous vehicles (CAVs). The in-car level managers 102 may collect data including images, locations of the vehicles, speeds of the vehicles, accelerations of the vehicles using various vehicle sensors such as one or more imaging sensors, GPS devices, Radar sensors, Lidar sensors, accelerometers, and the like.

Each of the in-car level managers 102 may process and abstract the collected data. In embodiments, the in-car level manager 102 may capture images of vehicles proximate to the in-car level manager 102 using one or more image devices and abstract the captured images to obtain feature information about the vehicles proximate to the in-car level manager 102. The feature information may include at least one of a vehicle speed, a vehicle acceleration, a multi-scale texture feature, a color feature, a vehicle model, a vehicle accessory, and the like. For example, as shown in FIG. 1B, an in-car level manager of a connected and autonomous vehicle 102-1 may obtain feature information about a non-connected vehicle 104. Specifically, the vehicle 102-1 may obtain the location, the speed, the acceleration, or other features of the non-connected vehicle 104 using various sensors including imaging sensors, GPS devices, Radar sensors, Lidar sensors, accelerometers, and the like.

In embodiments, the in-car level manager 102 may capture images of a road and abstract the captured images to obtain features related to road events including, but not limited to, construction cones, broken vehicles, roadside workers, police cars, ambulances, accidents, and the like. For example, as shown in FIG. 1B, an in-car level manager 102 of a connected and autonomous vehicle 102-2 may capture image of an incident 106 and abstract the captured image to obtain features related to the incident.

Referring to FIG. 1A, the second level 110 may include a plurality of second level managers, for example, section level managers 112. The section level managers 112 may be edge computing devices, such as road side units. Each of the section level managers 112 manages vehicles in a section, such as an intersection, a road segment, and the like. For example, by referring to FIG. 1B, a section level manager 112 manages vehicles in a section 114. The section level manager 112 may communicate with the vehicles 102-1 and 102-2 in the section 114. Each of the section managers 112 may receive information from the in-car level managers 102 and identify detected vehicles and/or road events based on the received information. For example, by referring to FIG. 1B, the section level manager 112 may receive information from the in-car level managers of the vehicles 102-1 and 102-2 and obtain dynamics and features of the detected vehicles including the vehicles 102-1 and 102-2 and the non-connected vehicle 104 and information about the incident 106 in the section 114 based on the information received from the in-car level managers of the vehicles 102-1 and 102-2. At the second level 110, the vehicles 102-1 and 102-2 may communicate with each other to share information obtained at the in-car level and estimate the surrounding vehicle dynamics and road event status. For example, the vehicle 102-1 directly communicates with the vehicle 102-2 via vehicle-to-vehicle (V2V) communication. As another example, the vehicle 102-1 may transmit its data to the section level manager 112 which relays the data to the vehicle 102-2. The latency of this information could be as low as 500 milliseconds.

In embodiments, each of the section level managers 112 may abstract the dynamics of vehicles in corresponding section. For example, by referring to FIG. 1B, the section manager 112 may abstract the dynamics of the vehicles 102-1 and 102-2 and the non-connected vehicle 104 in the section 114. Specifically, the section manager 112 may abstract the locations, speeds, and, accelerations of the vehicles 102-1 and 102-2 and the non-connected vehicle 104 in the section 114. The section manager 112 may also abstract the location and type of the road event such as the incident 106 in the section 114.

Referring back to FIG. 1A, the third level 120 may include a plurality of third level managers, for example, locality level managers 122. Each of the locality level managers 122 may receive abstracted data from one or more section managers 112. Each of the locality level managers 122 manages vehicles in a locality. The locality may be a small area with multiple intersections, a long freeway, a corridor with multiple intersections, and the like. The locality includes one or sections managed by the one or more section manager 112. For example, by referring to FIG. 1B, the locality level manager 122 manages vehicles in a locality 124. Each of the locality level managers 122 may aggregate information to obtain lane-level traffic conditions, such as speed, flow, density, and queue lengths for all sections that belong to the locality 124. Additionally, each of the locality level managers 122 may predict the impact of an event on each lane (e.g., traffic congestion, vehicle disturbance, and lane closure) to obtain short-term lane-level traffic conditions. The latency of obtaining the information is medium, e.g., about 2 seconds. Each of the locality level managers 122 may upload the lane-level information to corresponding city level manager 132.

Referring back to FIG. 1A, the fourth level 130 may include a plurality of fourth level managers, for example, city level managers 132. Each of the city level managers 132 may receive abstracted data from one or more locality level managers 122. Each of the city level managers 132 manages vehicles in a city, a town, or a village. The city includes one or more locality managed by the one or more locality level manager 122. For example, by referring to FIG. 1B, the city level manager 132 manages vehicles in a city 134. Each of the city level manager 132 gather the lane-level information received from one or more locality level manager 122 to estimate lane-group traffic conditions, such as average speed, density, flow, travel time delay, and the like. The lane-group is defined as a set of lanes that belong to the same road segment. Vehicles on the same lane-group share similar road properties, such as same turns at the end of a road, car pool lanes, freeway exiting lanes, and the like. The latency of estimating the information at the fourth level is relatively high, for example about 20 seconds.

The fifth level 140 may include a fifth level manager (e.g., a data center 142). The data center 142 may manage vehicles in a region, a state, or a nation. The nation includes one or more cities managed by the one or more city level managers 132. For example, by referring to FIG. 1B, the data center 142 manages vehicles in the United States or one of the states. The data center 142 may store historical information collected from all lower levels of managers. Based on the historical information, the data center 142 may obtain user preferences and system preferences. The user preferences and system preferences may be obtained at the latency around 1 minute to plan all trips inside a region or a state. The user preferences may include preferred departure times, transportation modes, the objective of trips, and the like. The system preferences may include travel time optimization of all vehicles, energy minimization, congestion allegation, and the like.

Figure 2:
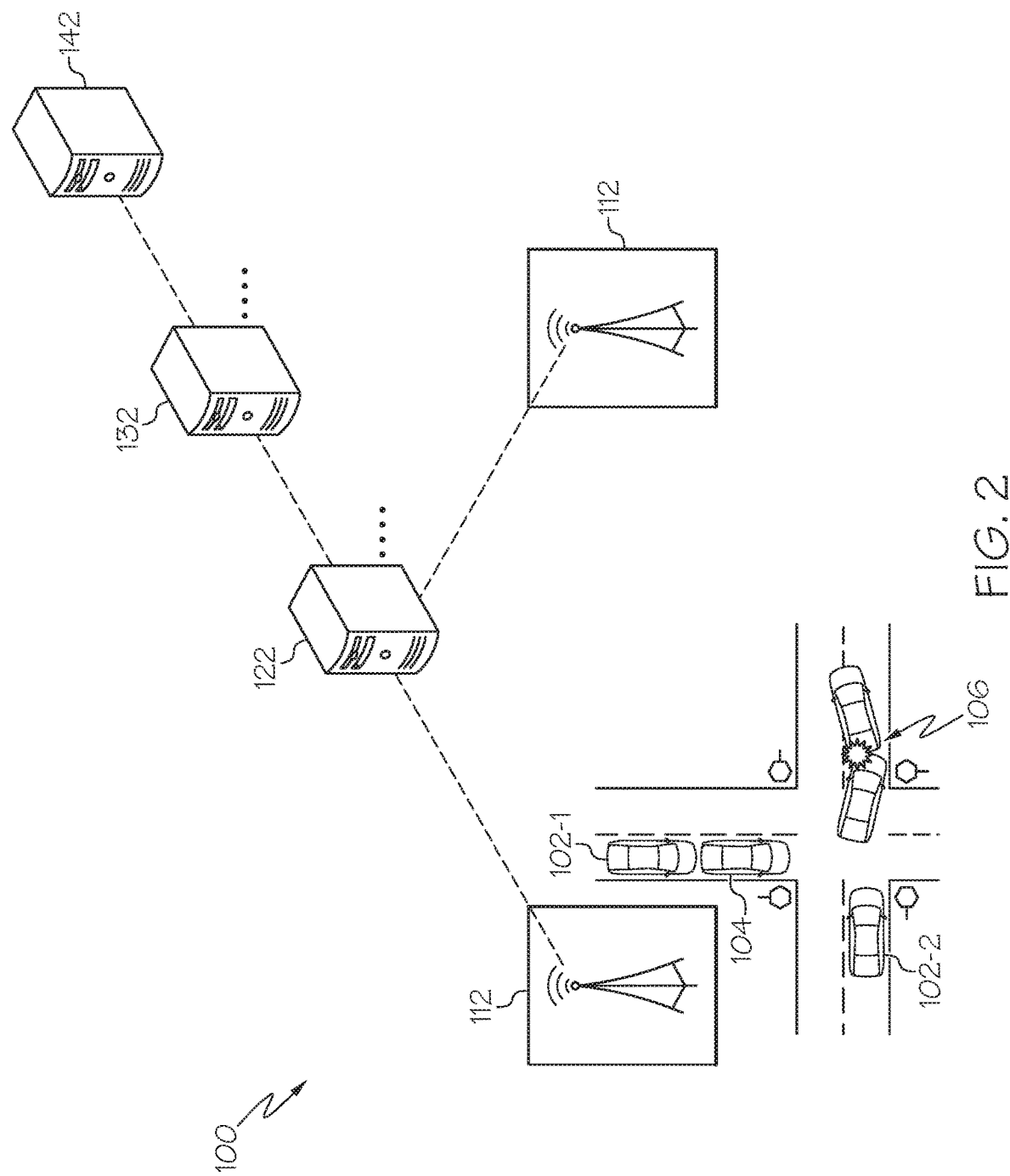
FIG. 2 depicts schematically depicts a hierarchical integrated traffic management system, according to one or more embodiments shown and described herein.

FIG. 2 depicts schematically depicts a hierarchical integrated traffic management system, according to one or more embodiments shown and described herein.

The hierarchical integrated traffic management system 100 includes a plurality of vehicles 102-1, 102-2, 104, a plurality of section level managers 112, a plurality of locality level manager 122, a plurality of city level managers 132, and a data center 142. Each of the vehicles 102-1, 102-2, and 104 may be a vehicle including an automobile or any other passenger or non-passenger vehicle such as, for example, a terrestrial, aquatic, and/or airborne vehicle. In some embodiment, the vehicle may be an unmanned aerial vehicle (UAV), commonly known as a drone.

In embodiments, the vehicles 102-1 and 102-2 may be autonomous and connected vehicles that navigate the environment with limited human input or without human input. The vehicle 104 may be a non-connected vehicle. The vehicles 102-1 and 102-2 may communicate with the section level manager 112. Each of the vehicles 102-1 and 102-2 may obtain traffic data including positions, orientations, speeds, accelerations, fuel consumptions, emissions, lane information, input acceleration pedal forces, input braking forces, and the like, using various vehicle sensors and transmit the traffic data to the section level manager 112. Each of the vehicles 102-1 and 102-2 may abstract the traffic data to obtain feature information including feature information of other vehicles (e.g., feature information of the non-connected vehicle 104) and feature information related to road events (e.g., the incident 106).

The section level manager 112 may be a road side unit or an edge computing device that is communicatively coupled to a higher level manager such as the locality level manager 122. One section level manager 112 may communicate with another section level manager 112. The section level manager 112 may receive abstracted traffic data from connected vehicles, such as the vehicles 102-1 and 102-2, and identify detected vehicles and/or road events based on the received data. For example, as shown in FIG. 2, the section manager 112 may receive information from the in-car level managers 102 of the vehicles 102-1 an 102-2 and collect dynamics and features of the detected vehicles including the vehicles 102-1 and 102-4 and the non-connected vehicle 104 and features of the incident 106 in the section managed by the section manager 112. The section level managers 112 may abstract the dynamics of the vehicles 102-1 and 102-2 and the non-connected vehicle 104. Specifically, the section manager 112 may abstract the locations, speeds, accelerations of the vehicles 102-1 and 102-2 and the non-connected vehicle 104. The section level manager 112 may also abstract the road event such as the incident 106. Then, the section level manager 112 may transmit the abstracted information to the locality level manager 122, which further abstracts the received data and transmits the abstracted data to the city-level manager 132. The city-level manager 132 further abstracts received data from the locality level manager 122 and transmits the abstracted data to the data center 142. In some embodiments, the section level manager 112 may share the abstracted information with other section level managers 112.

Figure 3:
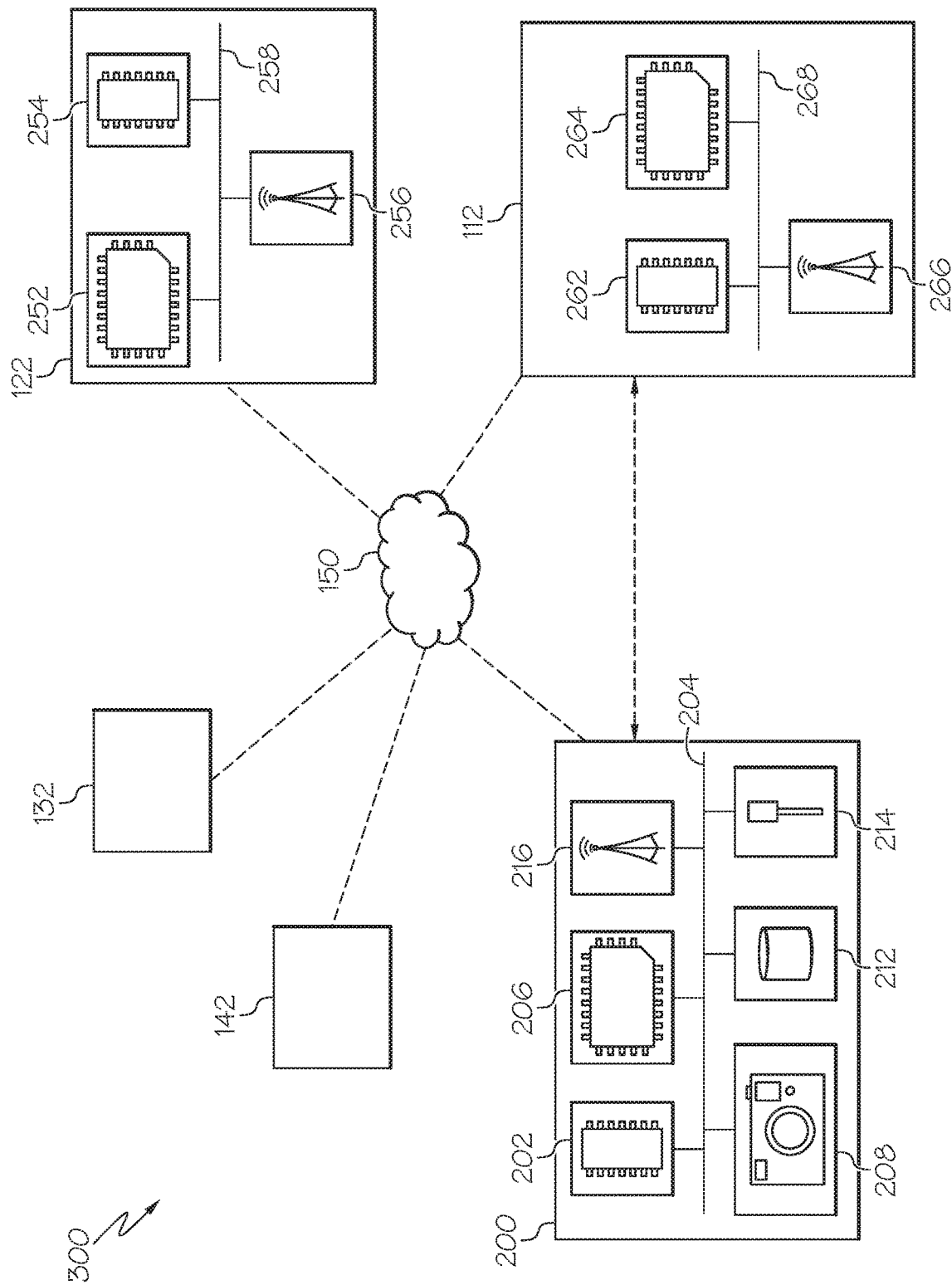
FIG. 3 depicts a schematic diagram of the hierarchical integrated traffic management system, in accordance with one or more embodiments shown and described herein.

FIG. 3 depicts a schematic diagram of the hierarchical integrated traffic management system, in accordance with one or more embodiments shown and described herein. The hierarchical integrated traffic management system 300 includes a vehicle system 200, the section level manager 112, the locality level manager 122, the city level manager 132, and the data center 142.

It is noted that, while the vehicle system 200 is depicted in isolation, the vehicle system 200 may be included within a vehicle in some embodiments, for example, within each of the plurality of vehicles 102-1 and 102-2 of FIG. 2. In embodiments in which the vehicle system 200 is included within a vehicle, the vehicle may be an automobile or any other passenger or non-passenger vehicle such as, for example, a terrestrial, aquatic, and/or airborne vehicle. In some embodiments, the vehicle is an autonomous vehicle that navigates its environment with limited human input or without human input. The vehicle system 200 may correspond to one of the in-car level managers 102 in FIG. 1A.

The vehicle system 200 includes one or more processors 202. Each of the one or more processors 202 may be any device capable of executing machine readable and executable instructions. Accordingly, each of the one or more processors 202 may be a controller, an integrated circuit, a microchip, a computer, or any other computing device. The one or more processors 202 are coupled to a communication path 204 that provides signal interconnectivity between various modules of the system. Accordingly, the communication path 204 may communicatively couple any number of processors 202 with one another, and allow the modules coupled to the communication path 204 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 204 may be formed from any medium that is capable of transmitting a signal such as, for example, conductive wires, conductive traces, optical waveguides, or the like. In some embodiments, the communication path 204 may facilitate the transmission of wireless signals, such as WiFi, Bluetooth®, Near Field Communication (NFC) and the like. Moreover, the communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Accordingly, the communication path 204 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The vehicle system 200 includes one or more memory modules 206 coupled to the communication path 204. The one or more memory modules 206 may comprise RAM, ROM, flash memories, hard drives, or any device capable of storing machine readable and executable instructions such that the machine readable and executable instructions can be accessed by the one or more processors 202. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 206. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Referring still to FIG. 2, the vehicle system 200 comprises one or more imaging sensors 208. The one or more imaging sensors 208 may be any device having an array of sensing devices capable of detecting radiation in an ultraviolet wavelength band, a visible light wavelength band, or an infrared wavelength band. The one or more imaging sensors 208 may have any resolution. In some embodiments, one or more optical components, such as a mirror, fish-eye lens, or any other type of lens may be optically coupled to the one or more imaging sensors 208. In embodiments described herein, the one or more imaging sensors 208 may provide image data to the one or more processors 202 or another component communicatively coupled to the communication path 204. The image data may include image data of the environment around a vehicle such as the vehicle 102-1 or 102-2 in FIG. 2. In some embodiments, the one or more imaging sensors 208 may also provide navigation support. That is, data captured by the one or more imaging sensors 208 may be used to autonomously or semi-autonomously navigate the vehicle 102-1 or 102-2.

The one or more imaging sensors 208 may operate in the visual and/or infrared spectrum to sense visual and/or infrared light. Additionally, while the particular embodiments described herein are described with respect hardware for sensing light in the visual and/or infrared spectrum, it is to be understood that other types of sensors are contemplated. For example, the systems described herein could include one or more LIDAR sensors, radar sensors, sonar sensors, or other types of sensors and that such data could be integrated into or supplement the data collection described herein to develop a fuller real-time traffic image.

In operation, the one or more imaging sensors 208 captures image data and communicates the image data to the one or more processors 202 and/or to other systems communicatively coupled to the communication path 204. The image data may be received by the one or more processors 202, which may process the image data using one or more image processing algorithms. Any known or yet-to-be developed video and image processing algorithms may be applied to the image data in order to identify an item or situation. Example video and image processing algorithms include, but are not limited to, kernel-based tracking (such as, for example, mean-shift tracking) and contour processing algorithms. In general, video and image processing algorithms may detect objects and movement from sequential or individual frames of image data. One or more object recognition algorithms may be applied to the image data to extract objects and determine their relative locations to each other. Any known or yet-to-be-developed object recognition algorithms may be used to extract the objects or even optical characters and images from the image data. Example object recognition algorithms include, but are not limited to, scale-invariant feature transform ("SIFT"), speeded up robust features ("SURF"), and edge-detection algorithms.

The vehicle system 200 comprises a satellite antenna 214 coupled to the communication path 204 such that the communication path 204 communicatively couples the satellite antenna 214 to other modules of the vehicle system 200. The satellite antenna 214 is configured to receive signals from global positioning system satellites. Specifically, in one embodiment, the satellite antenna 214 includes one or more conductive elements that interact with electromagnetic signals transmitted by global positioning system satellites. The received signal is transformed into a data signal indicative of the location (e.g., latitude and longitude) of the satellite antenna 214 or an object positioned near the satellite antenna 214, by the one or more processors 202.

The vehicle system 200 comprises one or more vehicle sensors 212. Each of the one or more vehicle sensors 212 is coupled to the communication path 204 and communicatively coupled to the one or more processors 202. The one or more vehicle sensors 212 may include one or more motion sensors for detecting and measuring motion and changes in motion of the vehicle. The motion sensors may include inertial measurement units. Each of the one or more motion sensors may include one or more accelerometers and one or more gyroscopes. Each of the one or more motion sensors transforms sensed physical movement of the vehicle into a signal indicative of an orientation, a rotation, a velocity, or an acceleration of the vehicle. The one or more vehicle sensors 212 may include a fuel sensor that measures the level of fuel of the vehicle. The one or more vehicle sensors 212 may also include one or more sensors for detecting the angle of a steering wheel of a vehicle, one or more sensors for detecting an acceleration pedal force, and one or more sensors for detecting a braking force. The one or more vehicle sensors 212 may include one or more radar sensors, one or more lidar sensors, or one or more sonar sensors.

Still referring to FIG. 2, the vehicle system 200 comprises network interface hardware 216 for communicatively coupling the vehicle system 200 to the section level manager 112. The network interface hardware 216 can be communicatively coupled to the communication path 204 and can be any device capable of transmitting and/or receiving data via a network. Accordingly, the network interface hardware 216 can include a communication transceiver for sending and/or receiving any wired or wireless communication. For example, the network interface hardware 216 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 216 includes hardware configured to operate in accordance with the Bluetooth® wireless communication protocol. The network interface hardware 216 of the vehicle system 200 may transmit its data to the section level manager 112.

The vehicle system 200 may connect with one or more external vehicles (e.g., the vehicle 102-2 in FIG. 2) and/or external processing devices (e.g., the section level manager 112) via a direct connection. The direct connection may be a vehicle-to-vehicle connection ("V2V connection") or a vehicle-to-everything connection ("V2X connection"). The V2V or V2X connection may be established using any suitable wireless communication protocols discussed above. A connection between vehicles may utilize sessions that are time and/or location-based. In embodiments, a connection between vehicles or between a vehicle and an infrastructure may utilize one or more networks to connect (e.g., the cloud network 129), which may be in lieu of, or in addition to, a direct connection (such as V2V or V2X) between the vehicles or between a vehicle and an infrastructure. By way of non-limiting example, vehicles may function as infrastructure nodes to form a mesh network and connect dynamically/ad-hoc. In this way, vehicles may enter/leave the network at will such that the mesh network may self-organize and self-modify over time. Other non-limiting examples include vehicles forming peer-to-peer networks with other vehicles or utilizing centralized networks that rely upon certain vehicles and/or infrastructure (e.g., the section level manager 112). Still other examples include networks using centralized servers and other central computing devices to store and/or relay information between vehicles.

Still referring to FIG. 3, the vehicle system 200 may be communicatively coupled to the section level manager 112 by a network 150. In one embodiment, the network 150 may include one or more computer networks (e.g., a personal area network, a local area network, or a wide area network), cellular networks, satellite networks and/or a global positioning system and combinations thereof. Accordingly, the vehicle system 200 can be communicatively coupled to the network 150 via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth®, Wireless USB, Z-Wave, ZigBee, and/or other near field communication protocols. Suitable cellular networks include, but are not limited to, technologies such as LTE, WiMAX, UMTS, CDMA, and GSM.

Still referring to FIG. 3, the section level manager 112 includes one or more processors 262, one or more memory modules 264, network interface hardware 266, and a communication path 268. The one or more processors 262 may be a controller, an integrated circuit, a microchip, a computer, or any other computing device. The one or more memory modules 264 may comprise RAM, ROM, flash memories, hard drives, or any device capable of storing machine readable and executable instructions such that the machine readable and executable instructions can be accessed by the one or more processors 262. In some embodiments, the network interface hardware 266 may be the same as the network interface hardware 216 of the vehicle system 200 described above. In some embodiments, the communication path 268 may be the same as the communication path 204 of the vehicle system 200 described above.

The one or more memory modules 264 may include machine readable instructions that, when executed by the one or more processors 262, identify detected vehicles and road events based on data received from vehicles such as the vehicles 102-1 and 102-2 in FIG. 2, and abstract the dynamics of the vehicles and the road events in the section managed by the section level manager 112.

Still referring to FIG. 3, the locality level manager 122 includes one or more processors 252, one or more memory modules 254, network interface hardware 256, and a communication path 258. The one or more processors 252 may be a controller, an integrated circuit, a microchip, a computer, or any other computing device. The one or more memory modules 254 may comprise RAM, ROM, flash memories, hard drives, or any device capable of storing machine readable and executable instructions such that the machine readable and executable instructions can be accessed by the one or more processors 252. In some embodiments, the network interface hardware 256 may be the same as the network interface hardware 216 of the vehicle system 200 described above. In some embodiments, the communication path 258 may be the same as the communication path 204 of the vehicle system 200 described above.

The one or more memory modules 254 may include machine readable instructions that, when executed by the one or more processors 252, abstract data received from one or more section level managers 112 to obtain lane-level traffic conditions.

The city level manager 132 may include similar elements as the locality level manager 122 and the section level manager 112. One or more memory modules of the city level manager 132 may include machine readable instructions that, when executed by one or more processors, abstract data received from one or more locality level managers 122 to obtain link level traffic conditions.

The data center 142 may include similar elements as the locality level manager 122 and the section level manager 112. One or more memory modules of the data center 142 may include machine readable instructions that, when executed by one or more processors, abstract data received from one or more city level managers 132 to obtain user and system preferences.

Figure 4:
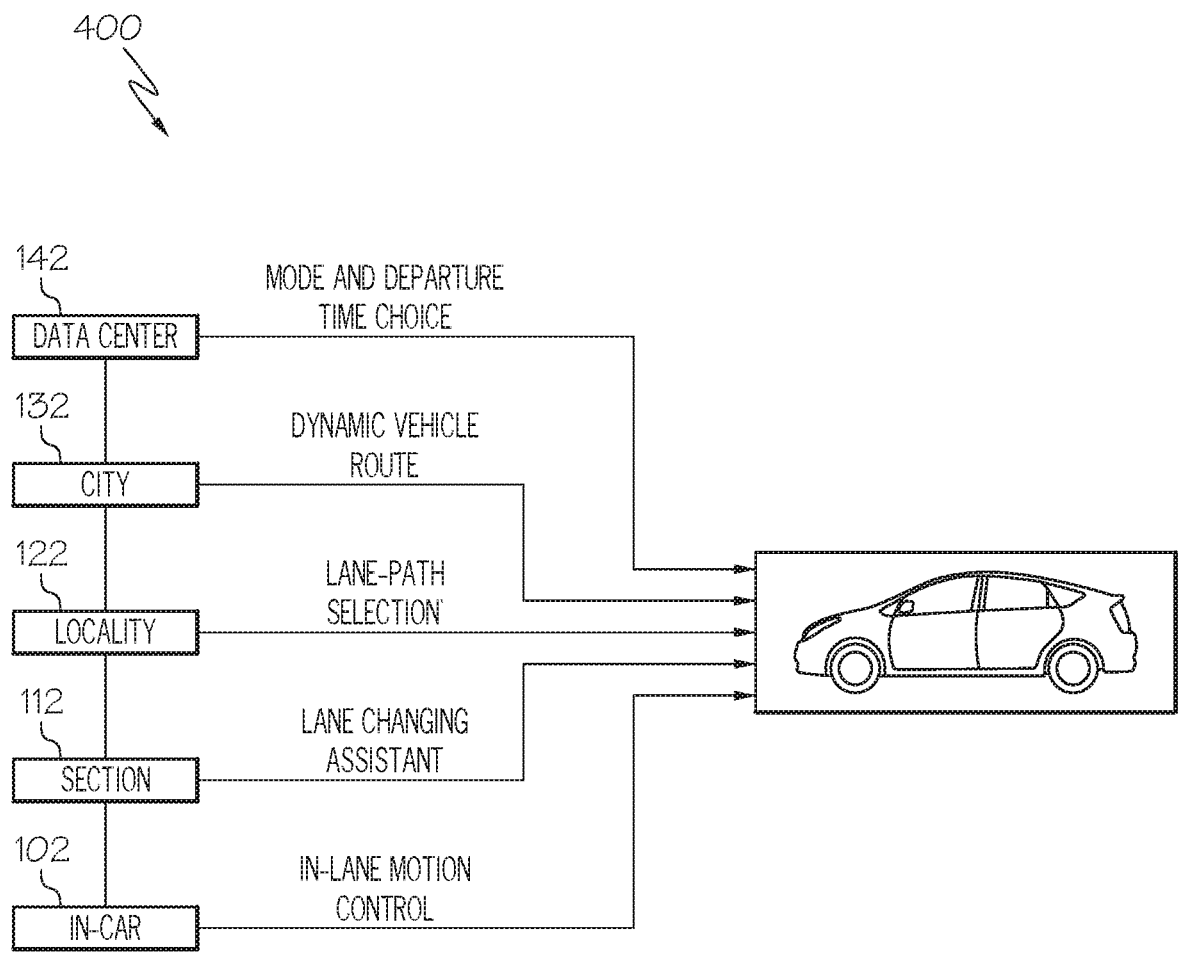
FIG. 4 depicts a hierarchical vehicle guidance system, according to one or more embodiments shown and described herein.

FIG. 4 depicts a hierarchical vehicle guidance system, according to one or more embodiments shown and described herein.

In embodiments, each of the various level managers transmits different instructions to each connected and autonomous vehicle. That is, the hierarchical vehicle guidance system 400 provides multi-level instructions to each vehicle. By referring to FIG. 4, at the data center level, the road traffic condition may be updated every 1 minute. The data center 142 may determine the departure times of all vehicles in a corresponding region (e.g., the nation, the state, or the like) such that each user can avoid peak traffic periods caused by road events and transportation pressure of the region can be alleviated based on event information and the user and system preferences stored in the data center 142. For example, the data center 142 identifies that peak traffic periods last from 7:45 am to 9:15 am. The data center 142 may suggest a departure time after 9:15 am to vehicles in the corresponding region. As another example, the data center 142 identifies a road event of construction in the region managed by the data center 142, and that time periods of the road event last from 1 am to 7 am. The data center 142 may suggest departure time after 7 am to vehicles in corresponding region.

In embodiments, the data center 142 may determine the transportation mode that each user is going to take for a trip such that each user can avoid peak traffic periods caused by road events and transportation pressure of the region can be alleviated based on event information and the user and system preferences stored in the data center 142. Specifically, if a user has flexible choices of transportation modes (e.g., driving, public transportation such as buses, trains, and the like), the data center 142 may instruct the user to take trains if the data center 142 identifies a severe incident which causes a shut down of some major roads in the region and/or massive congestion in the region. For example, the data center 142 may transmit a message to the vehicle of the user such that the display of the vehicle may output the message suggesting taking a train or other transportation mode. As another example, the data center 142 may transmit a message to the smartphone of the user informing the road event, and suggesting an alternative transportation mode.

Figure 5A:
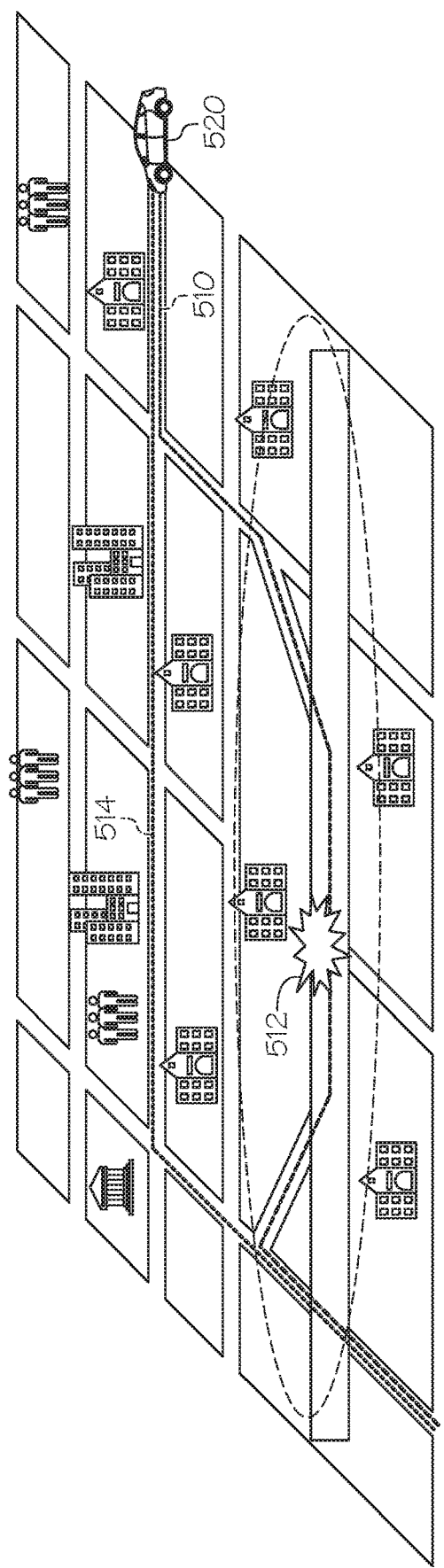
FIG. 5A depicts transmitting a rerouting instruction to a vehicle, according to one or more embodiments shown and described herein.

At the city level, the link-level traffic conditions may be updated at about every 20 seconds. Based on the updated link-level traffic conditions, the city level manager 132 may dynamically re-route vehicles in the city managed by the city-level manager 132 to search for the optimal path with the minimum travel time, delay, or fuel usage with the consideration of costs of all lane groups along each path. The city-level manager 132 may identify the impact of road events such as an incident, and the city-level manager 132 may transmit re-routing instructions to vehicles to avoid the congested region so as to reduce the pressure caused by the incident. For example, by referring to FIG. 5A, the link-level traffic conditions for a route 510 are updated at about every 20 seconds. The link-level traffic conditions may include traffic congestions due to an incident 512. Then, the city level manager 132 may dynamically re-route a vehicle 520 to take a path 514 instead of the route 510 which is affected by the incident.

Figure 5B:
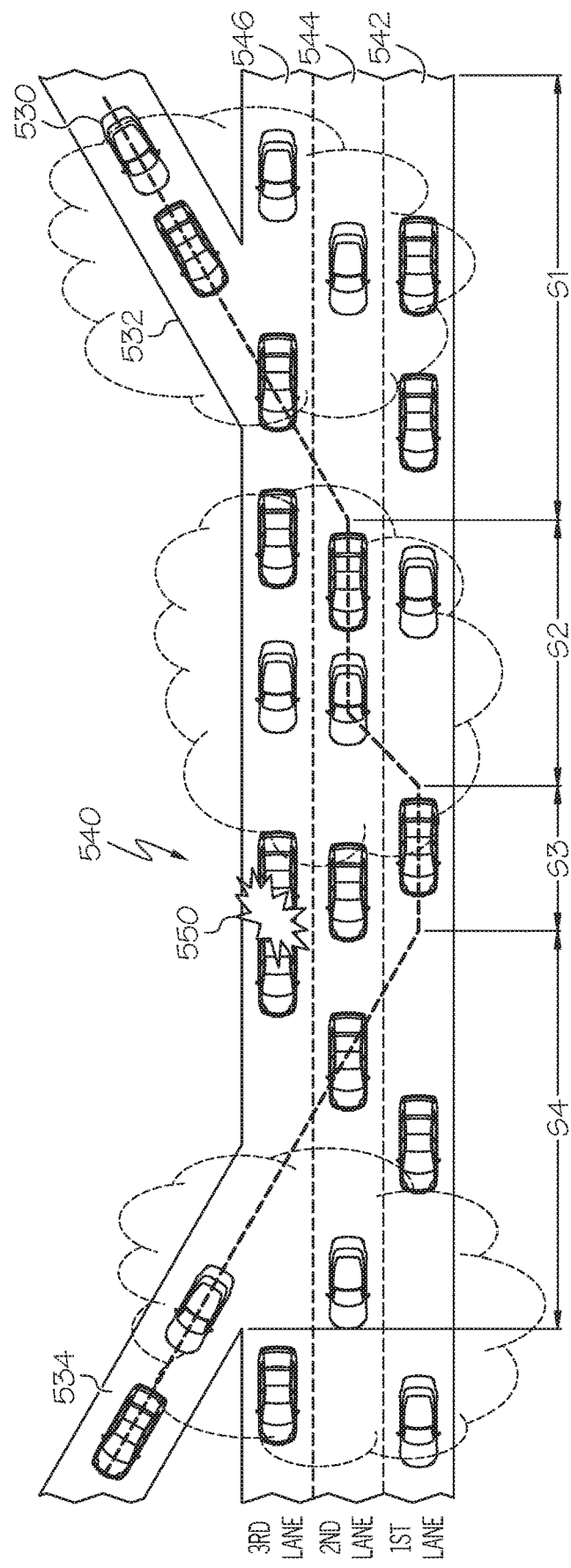
FIG. 5B depicts transmitting a lane-path selection instruction to a vehicle, according to one or more embodiments shown and described herein.

Referring back to FIG. 4, at the locality level, the locality level manager 122 may obtain lane-level traffic conditions at the latency around 2 seconds. With the accurate estimate of lane-level traffic, the locality level manager 122 may obtain an even more detailed path with lane selection on each road and transmit instructions on lane-path selections to vehicles. For example, by referring to FIG. 5B, the locality level manager 122 may obtain lane-level traffic conditions for a road 540 at the latency around 2 seconds. The road 540 includes three lanes: a first lane 542, a second lane 544, and a third lane 546. The locality level manager 122 may obtain information about an incident 550 in the third lane 546 as well as lane-level traffic conditions for each lane. Then, the locality level manager 122 may transmit lane-path selection instructions to a vehicle 530 that enters the road 540 though a ramp 532. Specifically, for a section S1, the locality level manager 122 may instruct the vehicle 530 to switch to the second lane 544. For a section S2, the locality level manager 122 may instruct the vehicle 530 to stay in the second lane 544. For a section S3, the locality level manager 122 may instruct the vehicle 530 to switch from the second lane 544 to the first lane 542. For a section S4, the locality level manager 122 may instruct the vehicle 530 to switch from the first lane 542 to the third lane 546 such that the vehicle 530 can take a ramp 534.

In this regard, the vehicles receive instructions from the locality level manager 122 such as the vehicle 530 may always travel on the fastest lanes. The instructions provided by the locality level manager 122 may also balance traffic on all lanes, so that the road can be better utilized. In addition, the path choices with the consideration of lane-level impact of incidents can control traffic flow entering the segment with the incidents so as to mitigate congestion caused by the incidents.

Figure 5C:
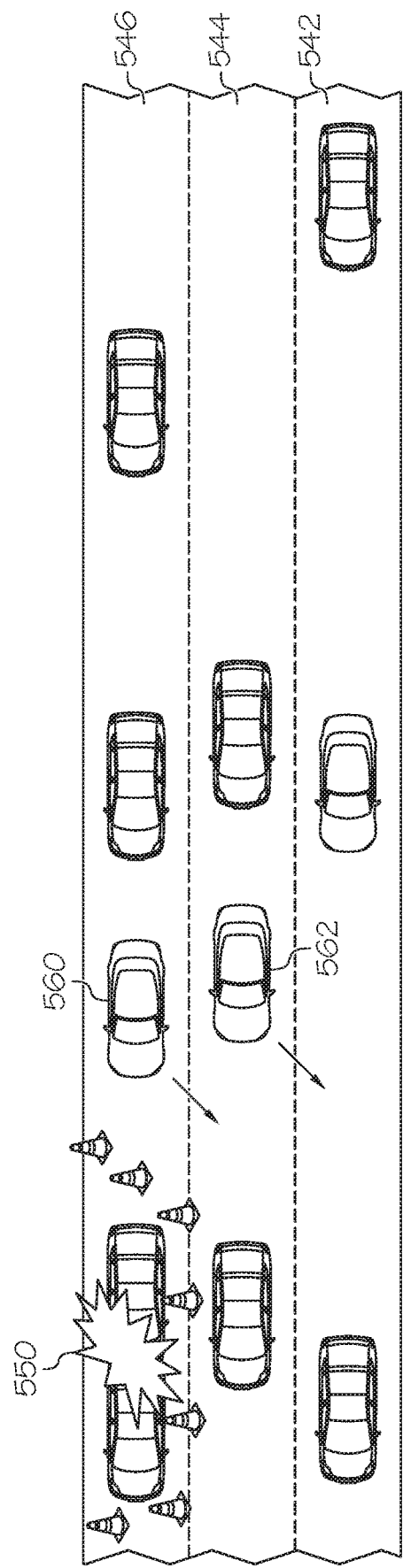
FIG. 5C depicts transmitting a lane-change assistance instruction to a vehicle, according to one or more embodiments shown and described herein.

Referring back to FIG. 4, at the section level, each connected vehicle can be informed with almost real-time dynamics of other connected vehicles and their detected non-connected vehicles and the status of an incident in a section managed by the section level manager 112. The section level manager 112 may instruct the connected vehicles to the open lanes with high speeds so that they can pass the incident faster. At the same time, the vehicles may not be queued ahead of the incident, and the queue can also be reduced. For example, by referring to FIG. 5C, an incident occurs on the third lane 546. The section level manager 112 may transmit instructions to connected vehicles 560 and 562 coming to the incident 550. Specifically, the section level manager 112 may instruct the connected vehicle 560 to switch from the third lane 546 to the second lane 544 and instruct the connected vehicle 562 to switch from the second lane 544 to the first lane 542 such that the connected vehicles 560 and 562 to pass the incident 550 without substantially reducing speeds.

Figure 5D:
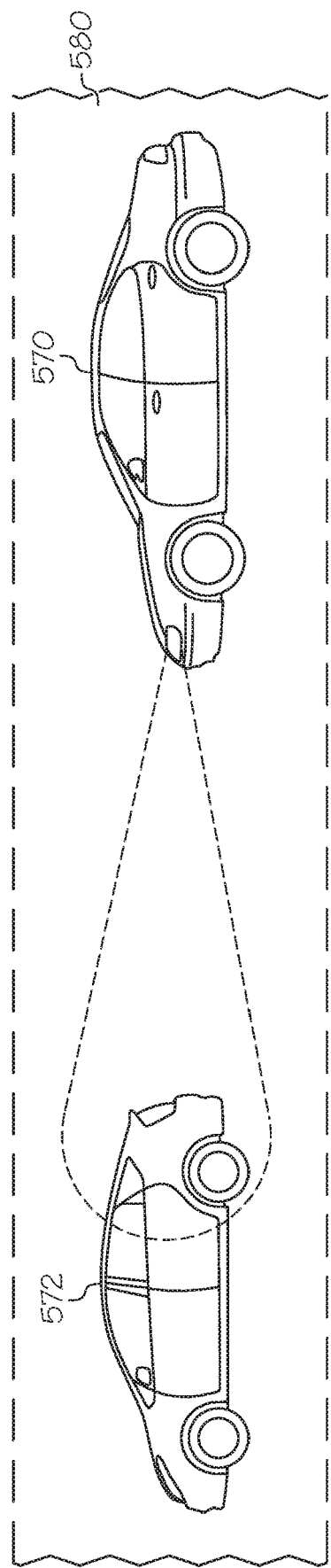
FIG. 5D depicts transmitting an in-lane motion control instruction to a vehicle, according to one or more embodiments shown and described herein.

At the in-car level, the instructions from all the upper levels may be integrated and executed by vehicle actuators to control gas pedal, break, steering angles, and the like. For example, by referring to FIG. 5D, a vehicle 570 drives in a lane 580. The vehicle 570 may be a connected and autonomous vehicle. The in-car level manager in the vehicle 570 may obtain the real-time dynamics of nearby vehicles such as a vehicle 572 in the same lane as the vehicle 570, and generate an in-lane motion plan. The vehicle 570 may drive based on the in-lane motion plan. Specifically, the vehicle 570 may determine its speed, acceleration, or declaration based on the in-lane motion plan, and convert them to control signals for vehicle actuators such as throttle actuators, brake actuators, and steering actuators.

In embodiments, instructions from all-level managers are provided to individual vehicles. For example, the data center 142, the city level manager 132, the locality level manager 122, the section level manager 112 and the in-car level manager 102 transmit guidance instructions to the same vehicle. The guidance instructions at different levels may have different priorities. Generally, the guidance instructions from lower levels have higher priorities as they are estimated based on the more detailed and more recent traffic information around one vehicle. The guidance instructions at the lower level may be able to better handle the immediate problems for the vehicle. The upper-level instructions may be coordinated to make sure that the previous instructions before the vehicle entering the lower-level control regions has been optimized for the upper-level traffic conditions.

Figure 6:
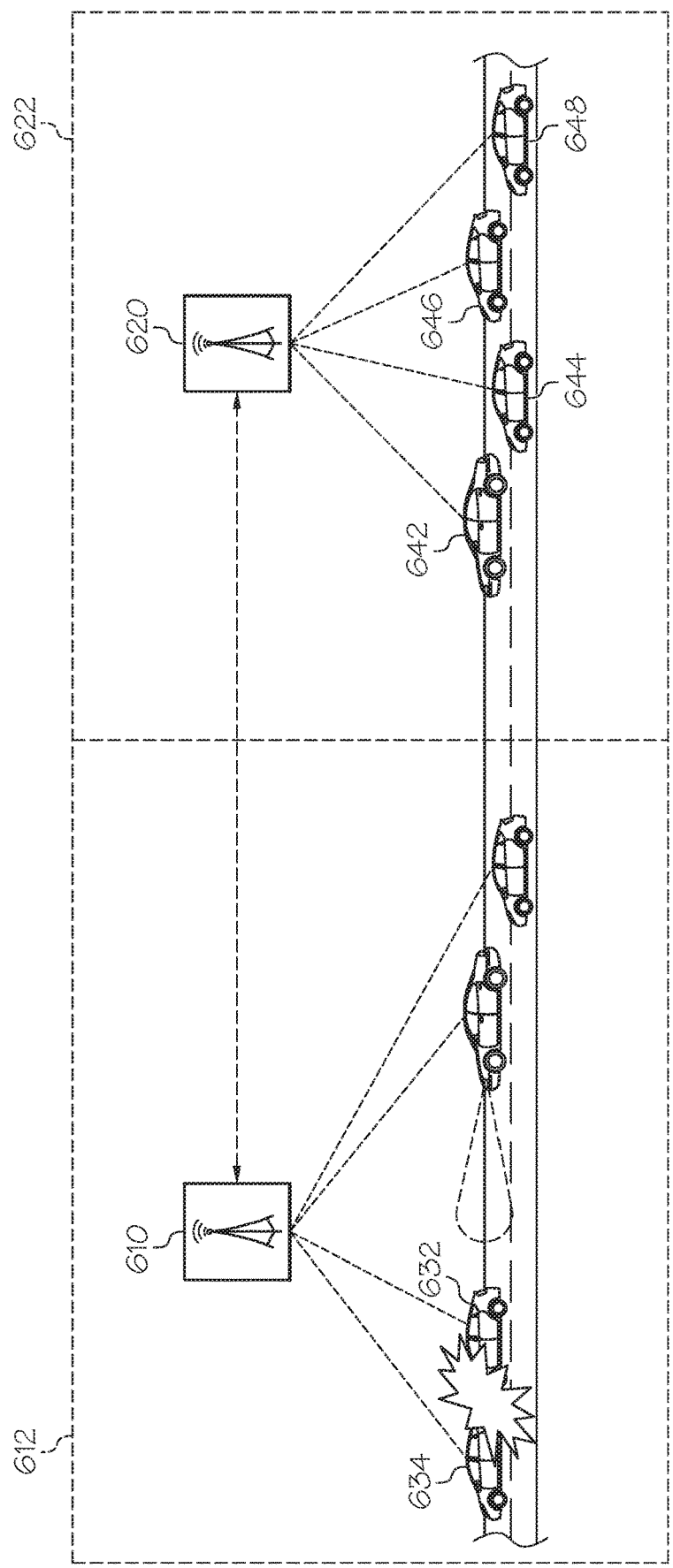
FIG. 6 depicts collaboration between multiple managers at the same level, according to one or more embodiments shown and described herein.

In the present system, the latencies at a lower level are smaller than the latencies at a higher level because of the natural sensing and aggregation technologies employed. Traffic conditions change over time. At lower levels of the system, because the changing conditions have higher impacts on the instructions, the lower level manager requires obtaining data with lower latencies. However, at higher levels, larger areas are physically covered, such that the benefits of providing low-latency information is marginal because vehicles need longer times to travel in the larger regions, and the frequent updated information may not be particularly useful to individual vehicles to make decisions FIG. 6 depicts collaboration between multiple managers at the same level, according to one or more embodiments shown and described herein. In embodiments, a plurality of managers at the same hierarchical level may collaborate with each other by sharing their collected data with each other. For example, by referring to FIG. 6, a first manager 610 manages a first area 612 and a second manager 620 manages a second area 622. The first manager 610 and the second manager 620 are at the same hierarchical level. Each of the first manager 610 and the second manager 620 may be the section level manager 112, the locality level manager 122, or the city level manager 132. The first manager 610 and the second manager 620 may communicate with each other via a network, such as via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth®, Wireless USB, Z-Wave, ZigBee, and/or other near field communication protocols. Suitable cellular networks include, but are not limited to, technologies such as LTE, WiMAX, UMTS, CDMA, and GSM.

The data collected by the first manager 610 may be transmitted to the second manager 620, and the second manager 620 may determine and transmit instructions to vehicles in the area 622 based on the data received form the first manager 610. Specifically, an in-car level manager of the vehicle 632 may collect data regarding an incident 634 (e.g., by taking an image using imaging sensors), abstract the data to obtain feature information about the incident 634, and transmit the feature information to the first manager 610. Then, the first manager 610 may transmit the feature information to the second manager 620. The second manager 620 may transmit instructions to vehicles 642, 644, 646, and 648 in the area 622 to reduce speed in response to receiving the feature information about the incident 634 in the area 612. As the vehicles in the area 622 reduce their speeds, less vehicles are entering the area 612 per unit time. In this regard, the congestion in the area 612 may be resolved or mitigated to prevent capacity drop caused by the congestion at the incident 634.

It should be understood that embodiments described herein are directed to hierarchical integrated traffic management systems for managing vehicles in response to road events. The present disclosure provides an integrated traffic management system that addresses the impact of road events on the performance of connected vehicles in large-scale road networks. A vehicle-oriented hierarchical framework is designed to implement the present system. The integrated traffic management system includes multiple hierarchical layers of managers. The integrated traffic management system contains two aspects. The first aspect is traffic information collection and abstraction. The second aspect is vehicle guidance. The information collection starts from the lowest layer (e.g., an in-car level). The collected information is abstracted at higher levels of road networks to achieve real-time update of traffic conditions and road event status with low latencies. The vehicle guidance is assigned to each level of the hierarchical system with respect to the available information to help vehicles and mitigate road congestions and events.

Compared with the existing traffic management framework, the present hierarchical integrated traffic management system has several advantages. First, the present disclosure applies a hierarchical framework to monitor traffic conditions and control connected vehicles with lower latencies at various levels of road networks. Second, the system is vehicle-oriented, which can work for various market penetration rates of connected vehicles, and may increase the performance of connected vehicles on large-scale road networks. The present system may satisfactorily address road events, especially their impact on vehicles' behavior and entire road congestions. The present system may be extended to all kinds of abnormal situations in transportation systems.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system for managing vehicles comprising:
a plurality of first level managers;
a plurality of second level managers each being in a higher hierarchical level than the plurality of first level managers and managing a section; and
a plurality of third level managers each being in a higher hierarchical level than the plurality of second level managers managing an area greater than the section, wherein:
each of the first level managers is configured to:
collect first data using one or more sensors of a vehicle; and
transmit a first instruction to the vehicle based on the first data, and one of the plurality of second level managers is configured to:
receive second data from one or more of the first level managers; and
transmit a second instruction to the vehicle based on the second data, one of the plurality of third level managers is configured to:
receive third data from one or more of the plurality of second level managers in the area managed by the one of the plurality of third level managers; and
transmit a third instruction to the vehicle based on the third data, and
wherein an actuator of the vehicle controls operations of the vehicle based on at least one of the first instruction, the second instruction, and the third instruction.

2. The system of claim 1, wherein a frequency of collecting the first data is higher than a frequency of obtaining the second information.

3. The system of claim 1, wherein the first data includes at least one of images captured by one or more imaging sensors of the vehicle, a location of the vehicle, a speed of the vehicle, and an acceleration of the vehicle, and
the second data includes at least one of feature information of other vehicles, and feature information about a road event.

4. The system of claim 3, wherein the feature information about the road event includes a locations of a construction site, a vehicle accident, an emergency vehicle, or a law enforcement vehicle.

5. The system of claim 1, wherein the third data includes at least one of vehicle dynamics and road event information in the section managed by corresponding second level manager.

6. The system of claim 1, wherein the vehicle is a connected and autonomous vehicle.

7. The system of claim 1, wherein one of the plurality of second level managers manages a first section, and another of the plurality of second level managers manages a second section adjacent the first section,
the third data of the one of the plurality of second level managers is shared with another of the plurality of second level managers, and
the another of the plurality of second level managers determines a second instruction to a vehicle in the second section based on the third data of the one of the plurality of second level managers.

8. The system of claim 1, wherein abstracted third data includes lane-level traffic information in the area managed by one of the plurality of third level managers, and
the third instruction includes an instruction on lane-level dynamic routing in the area managed by one of the plurality of third level managers.

9. The system of claim 1, further comprising:
a plurality of fourth level managers each being in a higher hierarchical level than the plurality of third level managers and managing a region greater than the area, wherein:
one of the plurality of fourth level managers is configured to:
receive fourth data from one or more of the plurality of third level managers in the region managed by the one of the plurality of fourth level managers; and
transmit a fourth instruction to the vehicle based on the fourth data.

10. The system of claim 9, wherein abstracted fourth data includes link-level traffic information, and
the fourth instruction includes a rerouting instruction in a region managed by one of the plurality of fourth level managers.

11. The system of claim 9, further comprising:
a data center in a higher hierarchical level than the plurality of fourth level managers, wherein:
the data center is configured to:
receive fifth data from the plurality of fourth level managers;
store user preferences;
determine a fifth instruction based on the fifth data and user preferences; and
transmit the fifth instruction to the vehicle.

12. The system of claim 11, wherein the fifth instruction includes a departure time suggestion or a transportation mode suggestion.

13. The system of claim 11, wherein the user preferences include at least one of preferred departure times, transportation modes, and objectives of trips.

14. The system of claim 11, wherein the data center is configured to:
store system preferences; and
determine the fifth instruction further based on the system preferences.

15. The system of claim 14, wherein the system preferences include at least one of travel time optimization of vehicles, energy minimization, and congestion alleviation.

16. A method for managing vehicles, the method comprising:
collecting, by a first level manager, first data using one or more sensors of a vehicle;
transmitting, by the first level manager, second data to a second level manager, the second level manager being in a higher hierarchical level than the first level manager;
transmitting, by the first level manager, a first instruction to the vehicle based on the first data;
transmitting, by the second level manager, a second instruction to the vehicle based on the second data;
receiving, by a third level manager, third data from the second level manager;
transmitting, by the third level manager, a third instruction to the vehicle based on the third data, wherein the third instruction is different from the second instruction,
wherein the third data includes lane-level traffic information in an area managed by the third level manager, and
an actuator of the vehicle controls operations of the vehicle based on at least one of the first instruction, the second instruction, and the third instruction.

17. The method of claim 16, further comprising:
receiving, by a fourth level manager, fourth data from the third level manager;
transmitting, by the fourth level manager, a fourth instruction to the vehicle based on the fourth data,
wherein the third instruction includes an instruction on lane-level dynamic routing in the area managed by the third level manager, and
the fourth instruction includes a rerouting instruction in a region managed by the fourth level manager.

18. The method of claim 17, further comprising:
receiving, by a data center, fifth data from the fourth level manager;
determining, by the data center, a fifth instruction based on the fifth data and user preferences; and
transmitting, by the data center, the fifth instruction to the vehicle,
wherein the fifth data includes link-level traffic information.

* * * * *

UNITED STATES PATENT AND TRADEMARK OFFICE
CERTIFICATE OF CORRECTION

| | | |
|---|---|---|
| PATENT NO. | : 11,626,012 B2 | |
| APPLICATION NO. | : 16/599667 | |
| DATED | : April 11, 2023 | |
| INVENTOR(S) | : Hao Yang and Kentaro Oguchi | |

It is certified that error appears in the above-identified patent and that said Letters Patent is hereby corrected as shown below:

In the Specification

In Column 14, Line(s) 28, after "received", delete "form" and insert --from--, therefor.

In the Claims

In Column 15, Line(s) 60, Claim 2, delete "information" and insert --data--, therefor.

Signed and Sealed this
Thirty-first Day of October, 2023

Katherine Kelly Vidal
*Director of the United States Patent and Trademark Office*